(No Model.)

L. HOLT.
PNEUMATIC TIRE.

No. 513,639. Patented Jan. 30, 1894.

WITNESSES:
W. H. James.
[signature]

INVENTOR:
Leopold Holt.
per Robt. C. L. Phillips.
Attorney.

UNITED STATES PATENT OFFICE.

LEOPOLD HOLT, OF FRANKFORT-ON-THE-MAIN, GERMANY.

PNEUMATIC TIRE.

SPECIFICATION forming part of Letters Patent No. 513,639, dated January 30, 1894.

Application filed October 16, 1893. Serial No. 488,215. (No model.) Patented in England December 6, 1892, No. 22,352.

*To all whom it may concern:*

Be it known that I, LEOPOLD HOLT, a subject of the Queen of Great Britain, temporarily residing at Frankfort-on-the-Main, in the Empire of Germany, have invented a new and useful Improvement in Pneumatic Tires, (for which I have obtained a patent in Great Britain, No. 22,352, bearing date the 6th of December, 1892,) of which the following is a specification.

My invention relates to improvements in pneumatic tires of the solid wall type, and it consists in placing within the tire an air tube carrying a series of strips or patches of film rubber attached at one edge or point, the said strips or patches being adapted to form sealing patches on the inner side of the tire, the object being to repair punctures in a more reliable and ready manner than is possible by any of the known methods. I attain this object by the construction shown in the accompanying drawings, in which—

Figure 1:
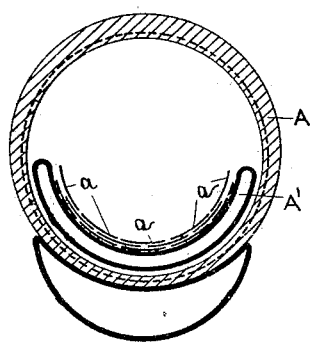
Figure 2:
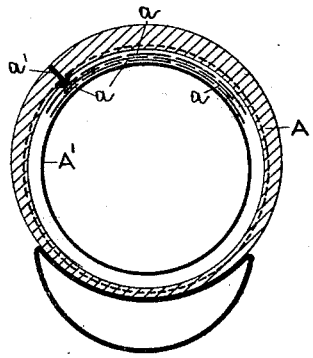
Figure 3:
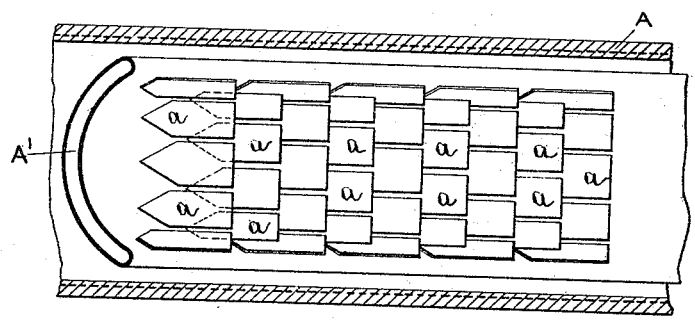
Figure 4:
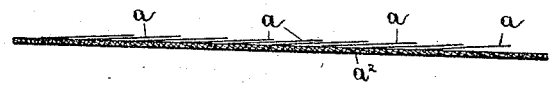

Figure 1 is a view in cross section of a pneumatic tire embodying my invention. Fig. 2 is a similar view showing how repairs are effected. Fig. 3 is a broken view in sectional plan showing one method of mounting and arranging the repairing strips or patches, and Fig. 4 is a broken view in section showing an alternative method of mounting the strips or patches.

Similar letters refer to similar parts throughout the several views.

The solid wall tire A is of the usual construction having the air chamber, canvas retaining cover or pocket, and the outer cover or tread all formed in one solid mass, either during or after the process of manufacture. The tire is provided with any suitable type of valve for inflation and deflation. Within the tire is a rubber air tube A' provided with any suitable type of valve for inflation and deflation. On to the outer part of the air tube A' is mounted a series of small strips or patches of film rubber "$a$," "$a$," &c. These strips are each attached to the air tube at one point or part only so as to be readily detachable therefrom and they are so arranged that they overlap each other in two or more layers either in the manner illustrated by Fig. 3 or in any other convenient manner. Although I prefer to use film rubber for these strips or patches any other flexible air-proof material may be used. This air tube A' is kept normally deflated as shown by Fig. 1 and is only inflated to bring the strips or patches "$a$," "$a$," &c., carried by it into contact with the punctured part of the air chamber of the tire.

When a tire is puctured, rubber solution is injected through the puncture in the well-known manner, and the air tube A' is inflated which brings one or more of the strips or patches carried by it into contact with the bead "$a'''$" of rubber solution on the inside of the puncture. After sufficient time has elapsed for the solution to dry the air tube is deflated which causes it to resume its position on the bottom of the tire. By this construction of tire a vehicle with a punctured tire can be used immediately the repair is effected, as the auxiliary air tube not only brings the repairing strips or patches up into contact with the bead of solution at the puncture but also inflates the tire. As however the air tube A' is only intended as a means to effect a repair it should be deflated as soon as the solution used for the repair is set, so as to prevent it becoming punctured, and as it is only used for the purpose of effecting the repair of the tire it may be made very light. When the air tube A is deflated after a repair has been made and air is pumped into the tire, the air tube returns and is forced down to the bottom of the air chamber tearing away from the repairing strip or patch and leaving it attached to the punctured part of the tire.

To insure the air tube returning to the bottom of the air chamber of the tire when it is deflated, it is preferably made of a shorter length than the inner circumference of the tire so that it is slightly stretched when in place.

As a further modification instead of mounting the strips or patches "$a$," "$a$," &c., directly on to the air tube A', they may be mounted on a strip "$a^2$" as shown by Fig. 3, and the said strip then attached to the said air tube.

The strips or patches "$a$," "$a$," &c., may cover any desired part or portion of the air tube and they may be attached thereto during the process of the manufacture of the said air tube if desired.

I wish it to be particularly understood that

I do not limit myself to the precise details of construction hereinbefore described and illustrated by the accompanying drawings, but that I hold myself at liberty to make such changes and alterations as fairly fall within the spirit and scope of my invention.

What I claim as my invention, and desire to secure by Letters Patent, is—

1. The combination with a pneumatic tire of the solid wall type having any suitable valve for inflation and deflation, of an air tube placed within the tire and provided with an independent valve for inflation and deflation and carrying on its outer surface a series of small strips or patches overlapping each other and attached either directly or indirectly to the said air tube by one point or at one part only so as to be easily detachable therefrom, as and for the purpose set forth.

2. The combination with a pneumatic tire of the solid wall type having any suitable valve for inflation and deflation, of an air tube placed within the tire and having an independent valve for inflation and deflation, and of a strip of flexible material adapted to be attached to the outer surface of the air tube within the tire and having a series of small strips or patches attached to it by one point or part only so as to be easily and readily detachable therefrom, as and for the purpose set forth.

3. The improved method of repairing punctures in pneumatic tires of the solid wall type, consisting of placing within the tire an air tube having a series of strips or patches attached either directly or indirectly to its outer face by one point or part only so as to be easily detached therefrom, of injecting through the puncture rubber solution, of inflating the air tube carrying the repairing strips or patches to bring one or more of them into contact with the solution injected through the puncture, and of deflating the said air tube when the solution is set and firmly attached to one or more of the repairing strips or patches, as set forth.

LEOPOLD HOLT.

Witnesses:
ROBT. ED. PHILLIPS,
GEORGE THOS. CLARK.